(No Model.)
H. MILLER.
LIFTING JACK.
No. 272,969. Patented Feb. 27, 1883.
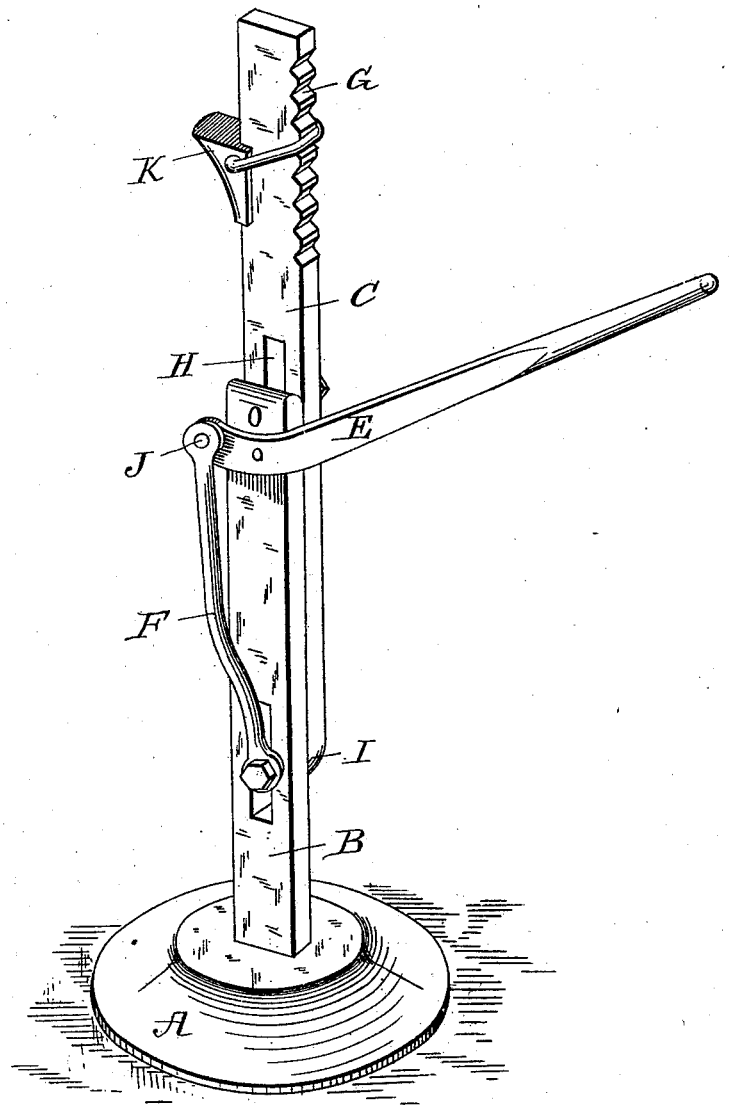
Attest
H. B. Applewhaite
R. K. Evans
Inventor
Henry Miller
per atty.
A. H. Evans & Co.

UNITED STATES PATENT OFFICE.

HENRY MILLER, OF GREELEY, COLORADO.

LIFTING-JACK.

SPECIFICATION forming part of Letters Patent No. 272,969, dated February 27, 1883.

Application filed January 5, 1883. (No model.)

*To all whom it may concern:*

Be it known that I, HENRY MILLER, of Greeley, in the county of Weld, State of Colorado, have invented a new and useful Improvement in Lifting Jacks; and I do hereby declare the following to be a full, clear, and exact description of the same, reference being had to the accompanying drawing, making part of this specification, in which the figure is a perspective view of my improved lifting-jack.

My invention relates to improvements in wagon jacks, by which an upright sliding bar with a projecting ratchet or attachment moves vertically or otherwise in an upright fixed slotted standard, and is worked by a connecting pitman and lever; and the objects of my improvements and invention are as follows: first, to raise the axle of a wagon, or of any description of vehicle whatever, so that the wheel may be removed with ease and readiness; second, to accomplish this purpose by an implement or machine which shall combine the elements of simplicity, lightness, strength, and durability and compactness of form; third, to keep the adjustable ratchet or attachment in place when set in position under the axle of the wagon or other vehicle, or when the implement or machine is not in use, by lowering the lever to the proper distance required.

The frame-work of the machine is the base A, into which is fastened the upright fixed slotted standard B. To the standard B is attached the upright sliding bar C by the lower end of the sliding bar being turned at right angles at the point I, so as to pass through the slot in the upright standard, and there secured by a burr. To the upright sliding bar C is attached by the link K the adjustable attachment, which can be moved up and down by means of the notches or ratchet G in the sliding bar C.

The lever E and the pitman F are connected to the machine as follows: The lever E is fastened by a rivet to the upper portion of the upright fixed standard. The pitman F is fastened to the sliding bar C at its lower end after it has passed through the slot in the upright standard B, and there secured by a burr. The upper end of the pitman F is secured to the lever E by a rivet at the shorter end of the lever projecting from the standard B. The upright sliding bar C is held firmly in its place, and moving readily up and down along the upright standard B, by means of a stationary bolt, with burr attached, fixed to the upper portion of the upright standard B, and passing through a slot, H, in the upright sliding bar C.

In the operation of the machine it is placed under the wagon, vehicle, or any other article or body of any kind which is to be lifted. The lever is then raised. The adjustable attachment is then placed in position immediately under and pressing closely the axle of the wagon or other vehicle, or the under side of any other article or body which is to be raised or lifted. The lever is then pressed down and the wagon or other vehicle or other article or body is raised or lifted to the required distance. When the lever E is thus pressed down to the required distance, it becomes so fixed by the action of the lever E and the pitman F at the pivotal point J on the upright standard B that the upright sliding bar C is firmly held in place, and the raised or lifted wagon or other vehicle or other article or body is held in the raised or lifted position as long as may be required.

Having thus described my invention, what I claim as new, and desire to secure by Letters Patent, is—

1. The lever E and pitman F, attached to a fixed standard, in combination with a moving sliding bar, C, substantially as and for the purpose herein specified.

2. The base A, the upright fixed slotted standard B, and the upright sliding bar C, provided with the slot H, in combination with the adjustable attachment D, the lever E, the pitman F, and the standard B, provided with the slots H, substantially as and for the purpose described.

HENRY MILLER.

Witnesses:
 LUTHER S. KAUFFMAN,
 JOHN MILLER.